May 10, 1927.
J. I. DUCHÂTEAU
ELASTIC WHEEL
Filed June 30, 1925
1,628,583
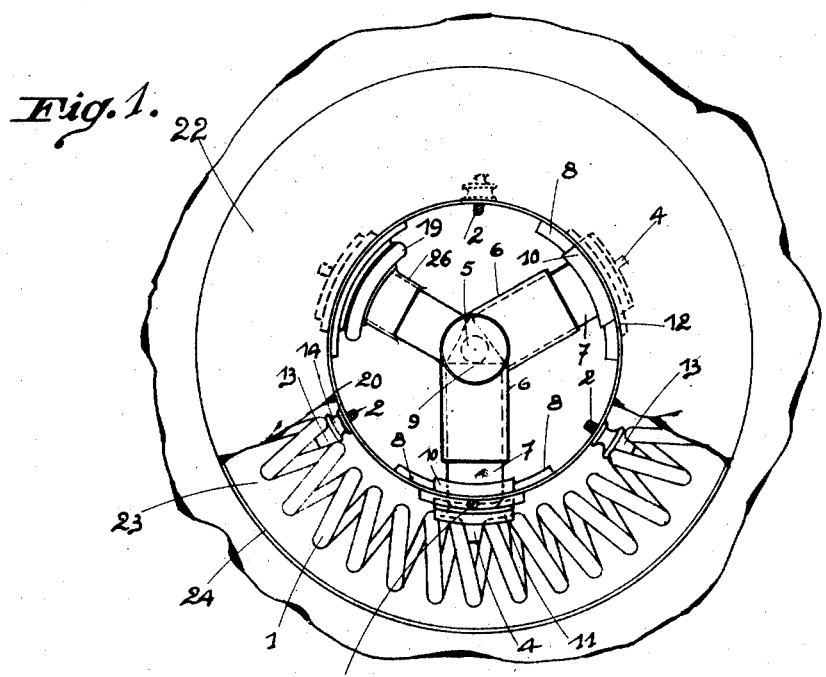
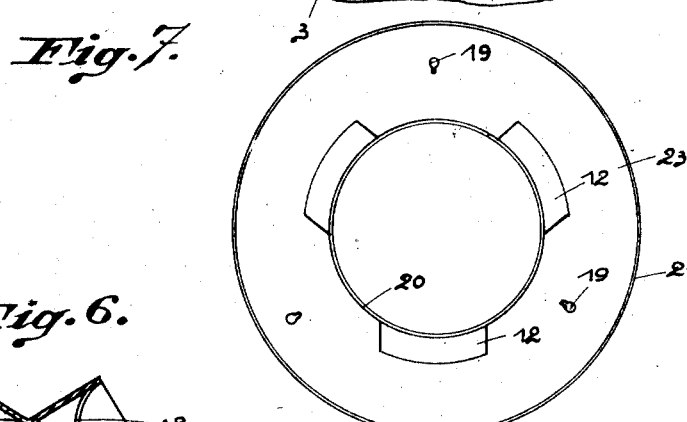
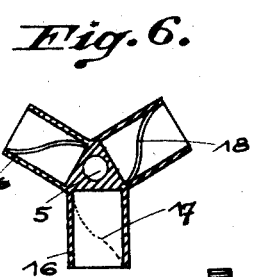
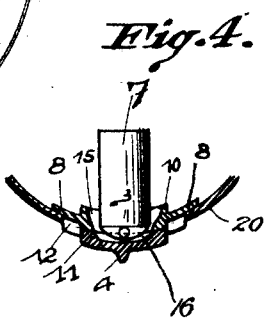
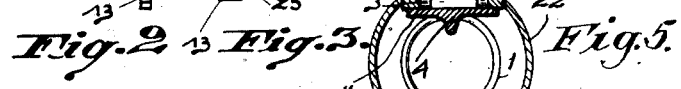
Inventor:
Jean Isidore Duchâteau
Attorney:

Patented May 10, 1927.

1,628,583

UNITED STATES PATENT OFFICE.

JEAN ISIDORE DUCHÂTEAU, OF ST. OMER, FRANCE.

ELASTIC WHEEL.

Application filed June 30, 1925, Serial No. 40,642, and in France July 15, 1924.

This invention relates to improvements in spring wheels according to my prior Patent No. 1,442,656 dated Jan. 16, 1923, and consists in various improvements relating to the working of the resilient helical ring within its median plane under the action of a plurality of radially disposed double hooked pins, some of which are secured upon a housing fixed to the wheel rim, the other ones, located between the first named pins, being hingedly connected to the radial, extensible spokes of the hub.

The present suspension of the hub is an improved mechanical one and combined, in a known manner with an air compressing device and with a lubricating device, both said latter being not claimed as novel.

This novel mechanical device, provides in three directions, at right angles with respect to each other, the resiliency required for a perfect damping of the shocks.

The improved device will be described hereinafter, with reference to the accompanying drawing in which:

Fig. 1 is an elevation of the hub member and housing, with one side disc in part removed.

Fig. 2 is a detailed view of a double hooked pin connecting the resilient ring to the housing.

Fig. 3 is a section of said pin on its seat on the central plane of the hollow spokes.

Fig. 4 is a vertical section through the median plane of a piston connected to the expansible spoke, provided with its projecting pin.

Fig. 5 is a section in a plane at 90° to the section of Fig. 4 and through the axis of the piston.

Fig. 6 shows a section of the hub member on the central plane of the hollow spokes.

Fig. 7 is an elevation showing the interior of the housing with circular guides.

The ring shaped resilient spring 1 is freely engaged within the housing; it is only retained by the pins (13) and (4) and supported on the base parts of the latter. The housing is formed of a sleeve 20 connected to two discs (22) (23) which latter are connected by a ring 24, outside the ring 1, and fixed to the wheel rim, the connections being in any suitable manner, as by welding.

The sleeve 20 is provided with windows through which extend the pistons and their accessory parts during the angular displacements of the pistons (7).

Said piston (7), on the side opposite to or away from the hub member, ends into a square portion and is provided on two opposite faces with pivot pins (3) maintained between two members (10) and (11). The member (11) bears a pin or pivot (4) which is engaged between the turns of the helical spring (1) and said members (10) (11) form on each side a slide (21) sliding on the flanges 12 of the windows of the sleeve (20).

The surface of the member (11) in contact with the spring (1) accommodates the outer periphery of the latter. The complemental member (10), through which extends the piston, is provided with wings (8) sliding on the sleeve (20), thus closing the window provided on said sleeve. In order that the pistons may freely oscillate round the axis formed by the pins, the aperture of the member (10) is funnel shaped at (15); two of its faces are inclined and the two other faces are in contact with the faces of the piston bearing the pins. The member (11) is also provided with a hollowed out portion and forms the bottom of the funnel (15) within which oscillates the rounded end of the piston.

The fixed pins (13) are double hooked thus maintaining the turns of the spring (1) within the grooves (25). They are fixed on the sleeve (20) and the seat (14), in contact with the spring (1), accommodates at one side the outer surface of the sleeve (20) and at the other side the outer periphery of the ring (1). The threaded end (2) of the pins extends through the sleeve (20) and is fixed in position by a nut. The ring (1) is fixed to the sleeve (20) by means of pins (13) or by any other means.

The hub is provided with hollow spokes (6) within which the pistons are slidingly engaged. Helical grooves (18) provided on the walls of the hollow spokes are coated by an inner coating (16) made of a suitable metal able to resist friction without abrasion. The fluid oil contained in the hub box, is distributed to the piston rods by said ducts and by means of holes (17) bored through the inner coating. The end wall of the cylinders cannot be bored, because said wall is intended to produce the compression of the mixture of air and oil when the pistons reach the end of their stroke.

Metal coating may be applied to the pistons; in this case the helical grooves would be provided in the coating, except the head of said piston rods, which would remain smooth. The compression of air at the inner end of the cylinders is optional; if desired the cylinder inner ends may be brought in communication with the outer air, either by a large opening or by small apertures through which the air escapes progressively and which may be provided with valves.

A pressed leather sleeve (19) secured on one hand to the ring (26) slidable on the outer periphery of the hollow spokes or cylinders, on the other hand on the member (10) near the piston rod, protects the whole against mud and dust.

Having now fully described my said invention, what I claim and desire to secure by Letters Patent, is:

1. In an elastic wheel, the combination of an elastic ring, an annular housing for the same, pins hooked on the turns of said elastic ring and secured to said housing, circular sliding members on the inner wall of the housing, pins carried by said sliding members and engaging turns of the ring between the first mentioned fastening pins, a hub member, hollow spokes on the same, rods telescoped and reciprocatable within said hollow spokes and pivotally connected to said circular sliding members, substantially as set forth.

2. In an elastic wheel, the combination of an elastic ring, an annular housing for the same, pins hooked on the turns of said elastic ring and secured to said housing, circular sliding members on the inner wall of the housing, pins carried by said sliding members and engaging turns of the ring between the first mentioned fastening pins, a hub member, hollow spokes on the same, rods telescoped and reciprocatable within said hollow spokes and pivotally connected to said circular sliding members, and means for air-tightly closing the ends of said hollow spokes, whereby the said rods will act like pistons to compress air within the ends of the hollow spokes, substantially as set forth.

3. In an elastic wheel, the combination of an elastic ring, an annular housing for the same, pins hooked on the turns of said elastic ring and secured to said housing, circular sliding members on the inner wall of the housing, pins carried by said sliding members and engaging turns of the ring between the first mentioned fastening pins, a hub member, hollow spokes on the same, rods telescoped and reciprocatable within said hollow spokes and pivotally connected to said circular sliding members, means for air-tightly closing the ends of said hollow spokes, whereby the said rods will act like pistons to compress air within the ends of the hollow spokes, and adjustable openings in the ends of the hollow spokes to moderate the action of compressed air, substantially as set forth.

4. In an elastic wheel, the combination of an elastic ring, an annular housing for the same, pins hooked on the turns of said elastic ring and secured to said housing, circular sliding members on the inner wall of the housing, pins carried by said sliding members and engaging turns of the ring between the first mentioned fastening pins, a hub member, hollow spokes on the same, rods telescoped and reciprocatable within said hollow spokes and pivotally connected to said circular sliding members, oil contained in the hub member, suitable conduits extending from the latter to the hollow spokes to lubricate the reciprocating rods, substantially as set forth.

5. In an elastic wheel, the combination of an elastic spring ring, an annular housing for the same, pins hooked on the turns of said elastic ring and secured to said housing, circular sliding members on the inner wall of the housing, pins carried by said sliding members and engaging turns of the ring between the first mentioned fastening pins, a hub member, hollow spokes on the same, rods telescoped and reciprocatable within said hollow spokes, a square end on each rod, pivot-pins on said square end to be received in circular notches in said sliding members.

6. In an elastic wheel, the combination of an elastic spring ring, an annular housing for the same, pins hooked on the turns of said elastic ring and secured to said housing, circular sliding members on the inner wall of the housing, said sliding members being formed of base members and the complemental members suitably connected together, pins carried by said base members and engaging turns of the ring between the first mentioned fastening pins, a hub member, hollow spokes on the same, rods telescoped and reciprocatable within said hollow spokes, a square end on each rod, pivot-pins on said square end to be received in and semi-circular notches in the base member and complemental member of each slide.

7. In an elastic wheel, the combination of an elastic spring ring, an annular housing for the same, radially arranged pins secured to the housing and engaging turns of said spring ring, circular slides on the inner wall of the housing, radial pins carried by said slides and engaging turns of the spring ring between the first mentioned fastening pins, a hub member, hollow spokes on the same, rods telescoped and reciprocatable within said hollow spokes and pivotal connections between said circular slides and said rods, substantially as set forth.

8. In an elastic wheel, the combination of an elastic spring ring, an annular housing for the same, pins secured to the housing and provided with a double hook to engage contiguous turns of said spring ring, a seat on said pins for the ring, accommodating the shape of the tore constituted by the latter, circular slides on the inner wall of the housing, radial pins carried by said slides and engaging turns of the spring ring between the first mentioned fastening pins, a hub member, hollow spokes on the same, rods telescoped and reciprocatable within said hollow spokes and pivotal connections between said circular slides and said rods, substantially as set forth.

9. In an elastic wheel, the combination of an elastic spring ring, an annular housing for the same, pins secured to said housing and engaging turns of said spring ring, circular slides on the bottom or inner wall of the housing, said slides being formed of base members and complemental members suitably connected together, a base on each slide, accommodating the shape of the tore formed by the spring ring, a pin radially directed with relation to the spring ring onto said base connected therewith, means for circularly guiding said slides in the housing, a hub-member, hollow spokes on the same, rods telescoped and reciprocatable within said hollow spokes, pivotal connections between said rods and said slides, whereby the movements of the reciprocating rods are transmitted to said slides and through them to the pins connected therewith.

In testimony whereof I have hereunto set my hand.

JEAN ISIDORE DUCHÂTEAU.